United States Patent
Matsuo et al.

(10) Patent No.: US 10,208,459 B2
(45) Date of Patent: Feb. 19, 2019

(54) VOLUME ESTIMATION DEVICE AND WORK MACHINE USING SAME

(71) Applicant: Hitachi, Ltd., Chiyoda-ku, Tokyo (JP)

(72) Inventors: Shigeru Matsuo, Tokyo (JP); Noriyasu Hasejima, Tokyo (JP); Kenichirou Kurata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 15/527,027

(22) PCT Filed: Dec. 12, 2014

(86) PCT No.: PCT/JP2014/082911
§ 371 (c)(1),
(2) Date: May 16, 2017

(87) PCT Pub. No.: WO2016/092684
PCT Pub. Date: Jun. 16, 2016

(65) Prior Publication Data
US 2017/0328032 A1    Nov. 16, 2017

(51) Int. Cl.
*E02F 9/26* (2006.01)
*G01B 11/00* (2006.01)
(Continued)

(52) U.S. Cl.
CPC ............... *E02F 9/262* (2013.01); *E02F 3/43* (2013.01); *G01B 11/00* (2013.01); *G06T 7/55* (2017.01);
(Continued)

(58) Field of Classification Search
CPC ........................................................ E02F 9/26
(Continued)

(56) References Cited

U.S. PATENT DOCUMENTS

| 7,669,354 B2* | 3/2010 | Aebischer | E02F 9/264 |
| | | | 37/348 |
| 8,700,357 B2* | 4/2014 | Fehrenbach | G01F 23/28 |
| | | | 702/166 |

(Continued)

FOREIGN PATENT DOCUMENTS

| JP | 2-195202 A | 8/1990 |
| JP | 4-301707 A | 10/1992 |

(Continued)

OTHER PUBLICATIONS

International Search Report (PCT/ISA/210) issued in PCT Application No. PCT/JP2014/082911 dated Mar. 17, 2015 with English-language translation (four (4) pages).

(Continued)

*Primary Examiner* — Gary S Hartmann
(74) *Attorney, Agent, or Firm* — Crowell & Moring LLP

(57) ABSTRACT

A blind spot estimation portion for estimating the blind spot region of the object in the bucket; a blind spot region shape estimation portion for estimating a shape of the object in the blind spot region; and a volume estimation portion for estimating a volume of the object in the blind spot region are included, the blind spot estimation portion estimates the blind spot region by mesh disparity data obtained from a captured image of the object in the bucket imaged by a plurality of cameras, the blind spot region shape estimation portion estimates the shape of the object in the blind spot region by the mesh disparity data, and the volume estimation portion estimates the volume of the object in the blind spot region based on the shape of the object in the blind spot region estimated by the blind spot region shape estimation portion and a shape of a bottom of the bucket.

8 Claims, 14 Drawing Sheets

(51) Int. Cl.
*H04N 13/207* (2018.01)
*E02F 3/43* (2006.01)
*G06T 7/55* (2017.01)
*H04N 13/271* (2018.01)
*H04N 13/239* (2018.01)
*H04N 13/00* (2018.01)

(52) U.S. Cl.
CPC ......... *H04N 13/207* (2018.05); *H04N 13/239* (2018.05); *H04N 13/271* (2018.05); *E02F 9/26* (2013.01); *H04N 2013/0081* (2013.01)

(58) Field of Classification Search
USPC .......................................................... 37/413
See application file for complete search history.

(56) References Cited

U.S. PATENT DOCUMENTS

| | | | | |
|---|---|---|---|---|
| 8,930,091 | B2* | 1/2015 | Upcroft | E02F 9/26 37/348 |
| 9,829,364 | B2* | 11/2017 | Wilson | A01D 41/00 |
| 2010/0101317 | A1* | 4/2010 | Ashrafzadeh | G01F 23/0061 73/149 |
| 2010/0245542 | A1* | 9/2010 | Kim | G01B 11/00 348/46 |
| 2016/0061643 | A1* | 3/2016 | Wilson | G01F 23/292 73/149 |
| 2018/0120098 | A1* | 5/2018 | Matsuo | E02F 9/26 |

FOREIGN PATENT DOCUMENTS

| | | |
|---|---|---|
| JP | 4-301708 A | 10/1992 |
| JP | 2003-247805 A | 9/2003 |
| JP | 2008-241300 A | 10/2008 |
| JP | 2013-15394 A | 1/2013 |
| JP | 2013-25528 A | 2/2013 |
| JP | 2014-89104 A | 5/2014 |

OTHER PUBLICATIONS

Japanese-language Written Opinion (PCT/ISA/237) issued in PCT Application No. PCT/JP2014/082911 dated Mar. 17, 2015 (four (4) pages).

* cited by examiner

[Fig. 1]
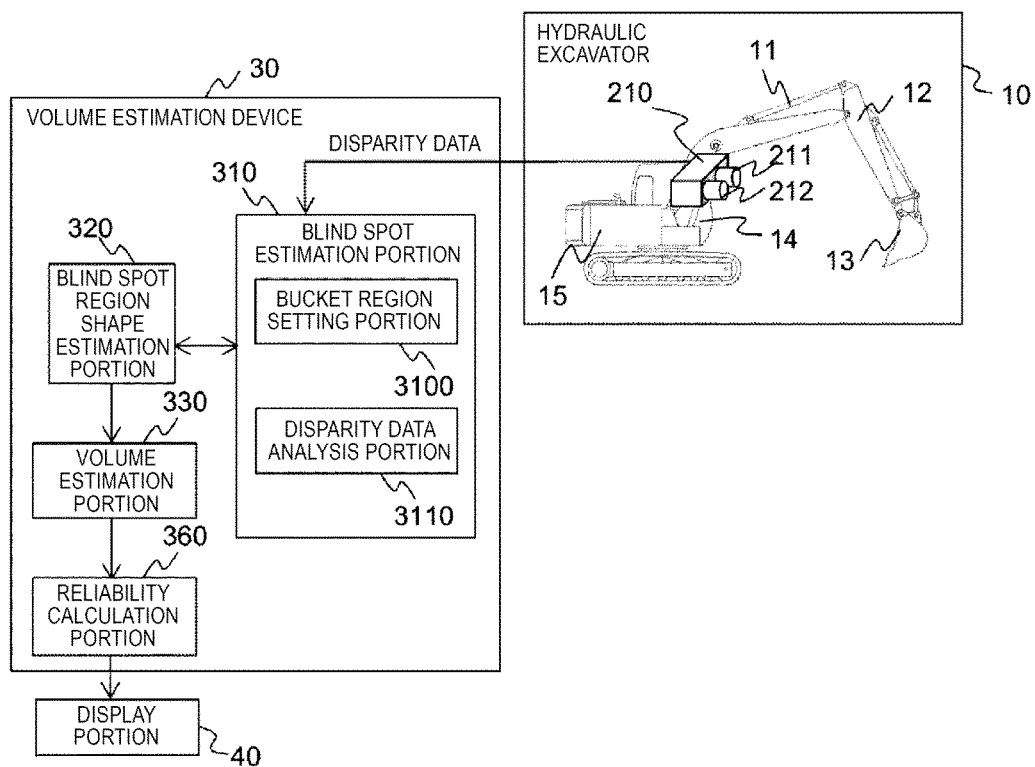

[Fig. 2]
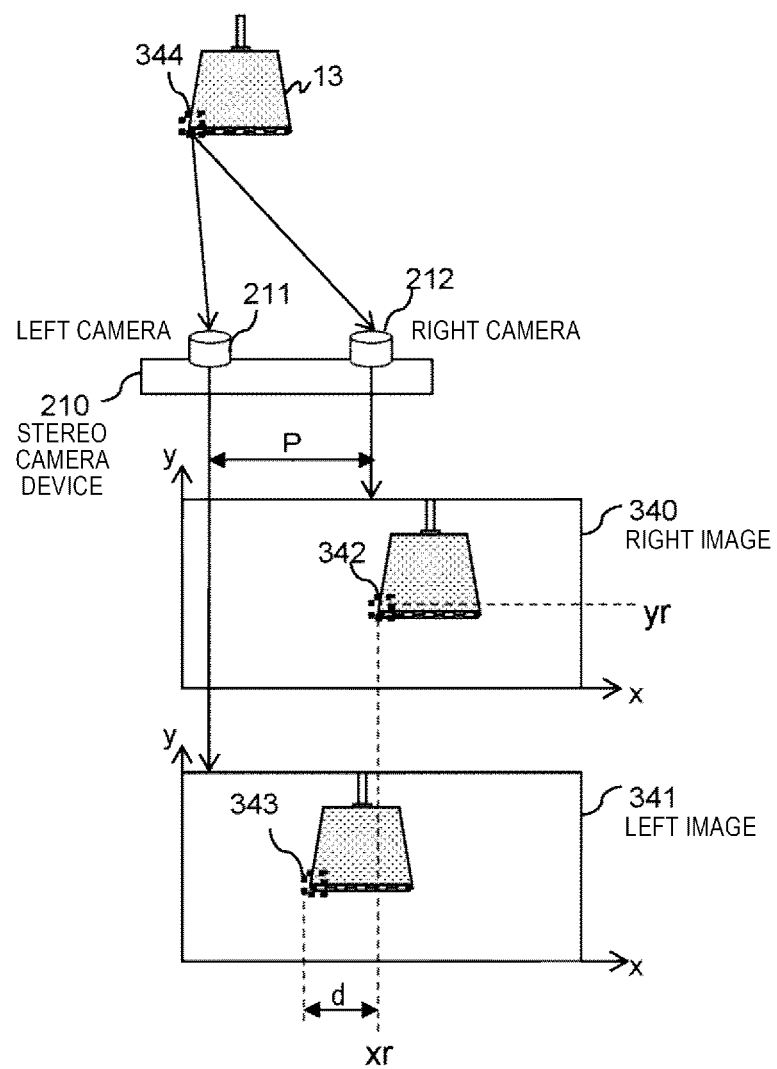

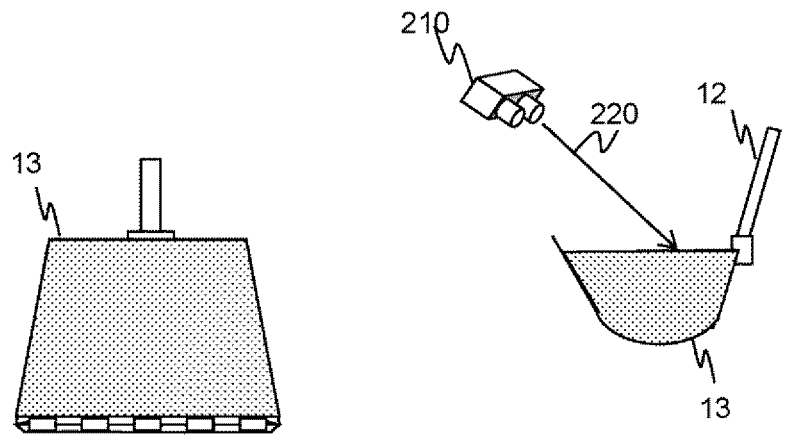
[Fig. 3A]     [Fig. 3B]
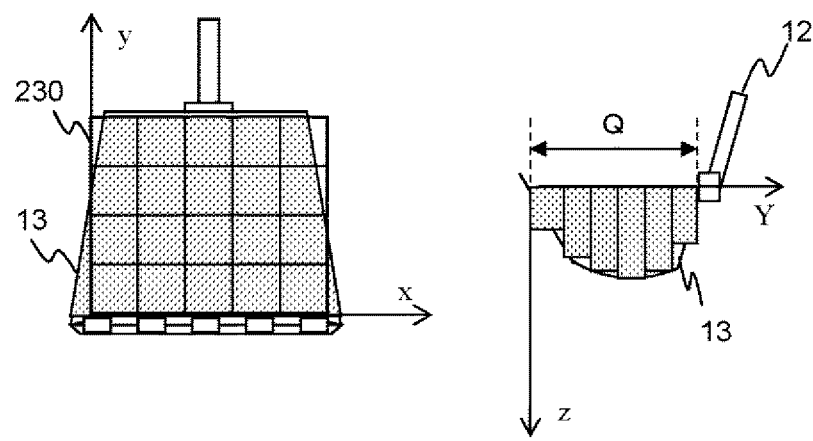
[Fig. 4A]     [Fig. 4B]

[Fig. 5]
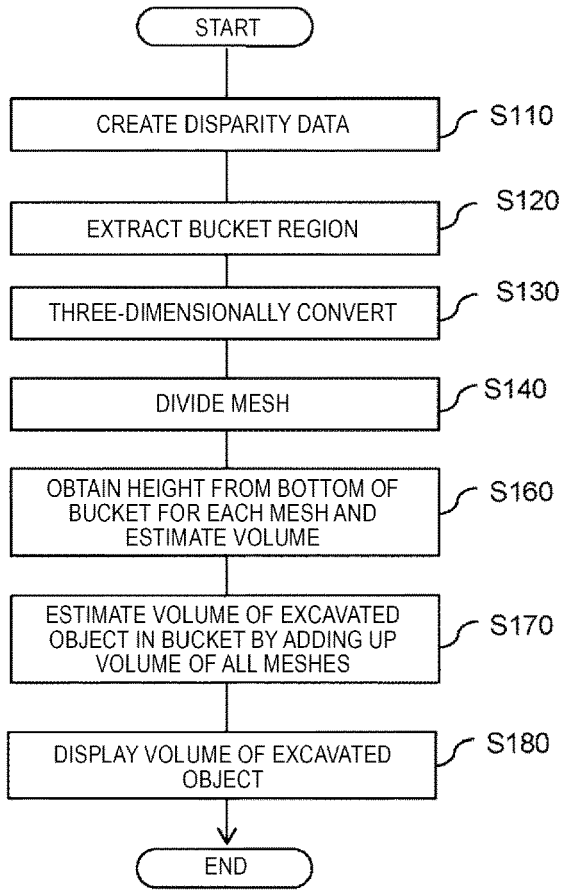
[Fig. 6A]
[Fig. 6B]
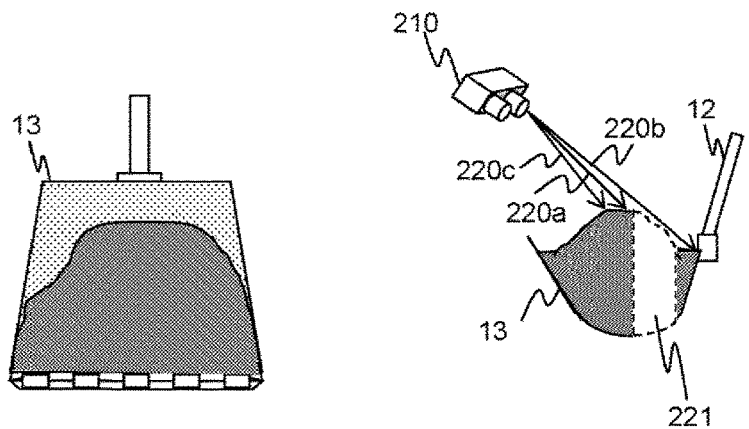

[Fig. 7]
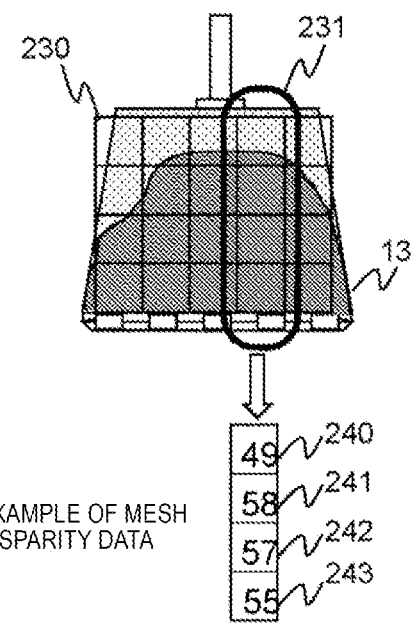
EXAMPLE OF MESH DISPARITY DATA
[Fig. 8]
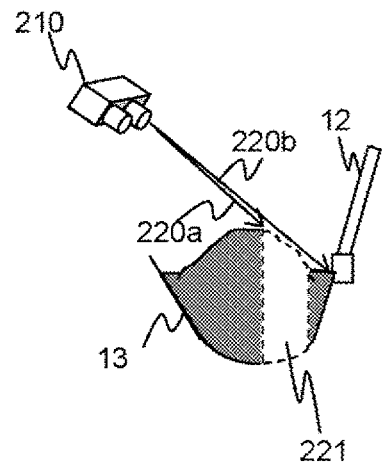

[Fig. 9]
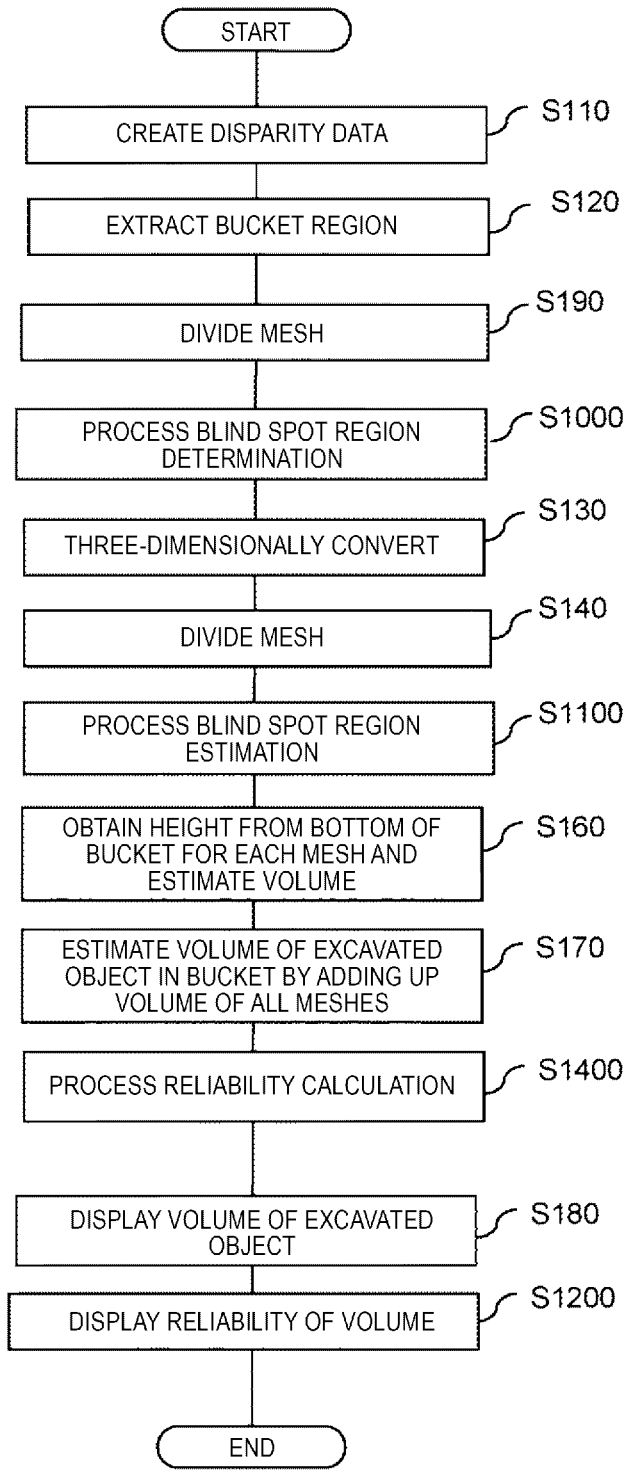

[Fig. 10]
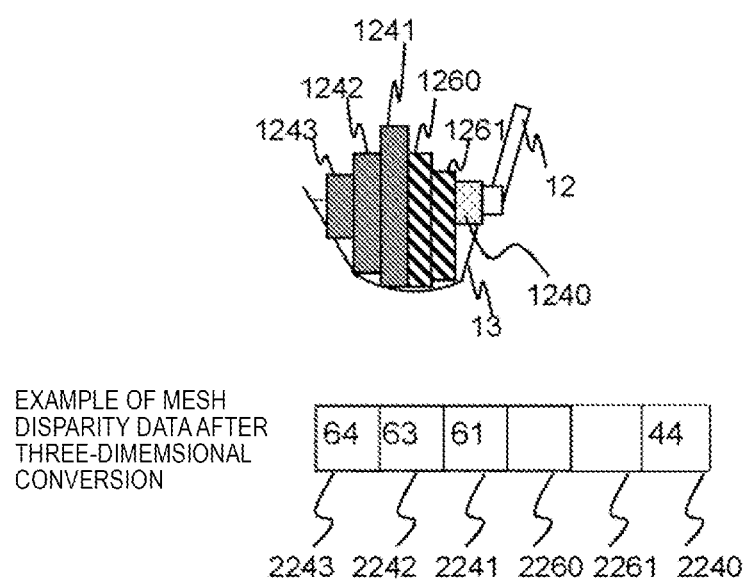

[Fig. 11]
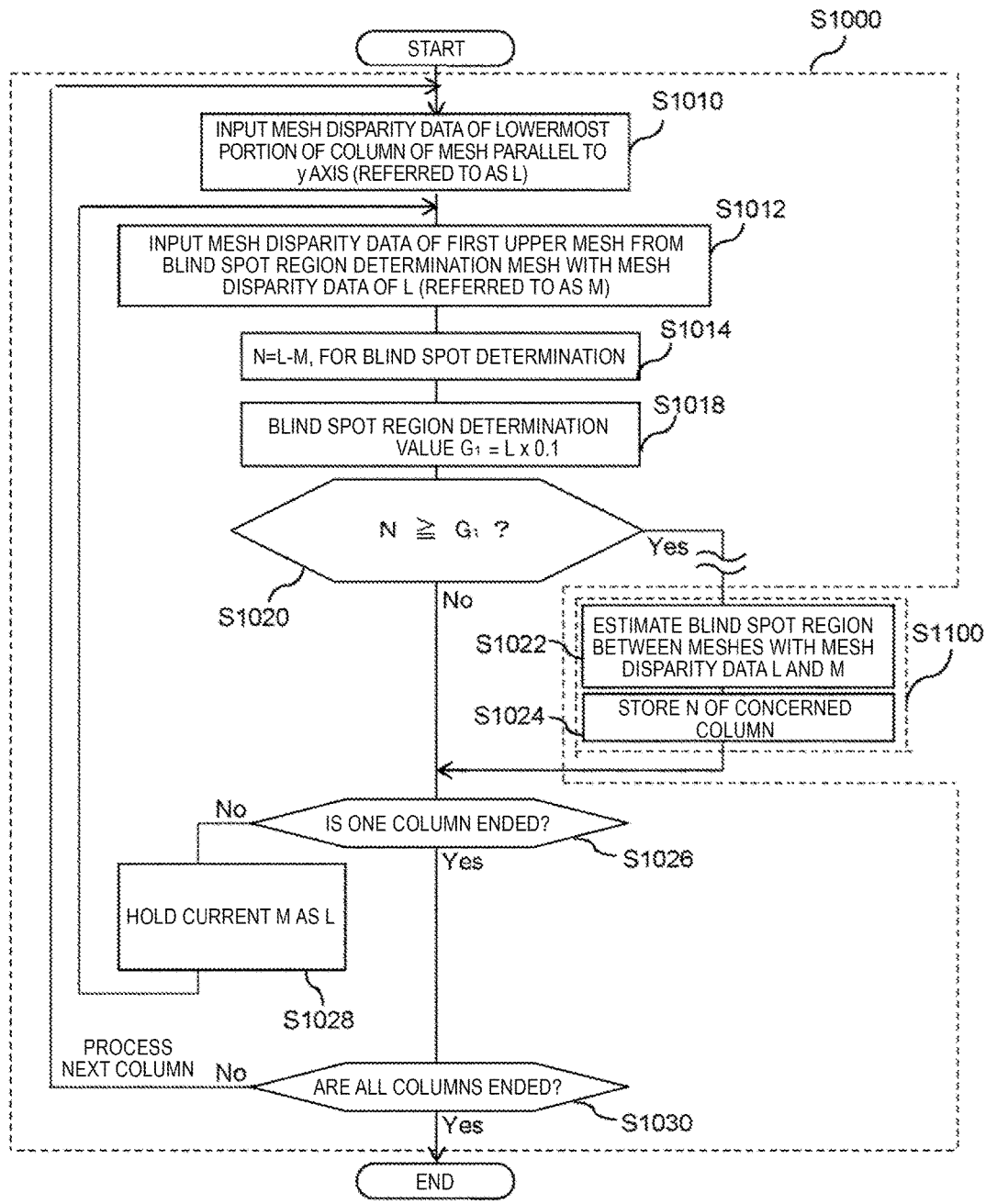

[Fig. 12]
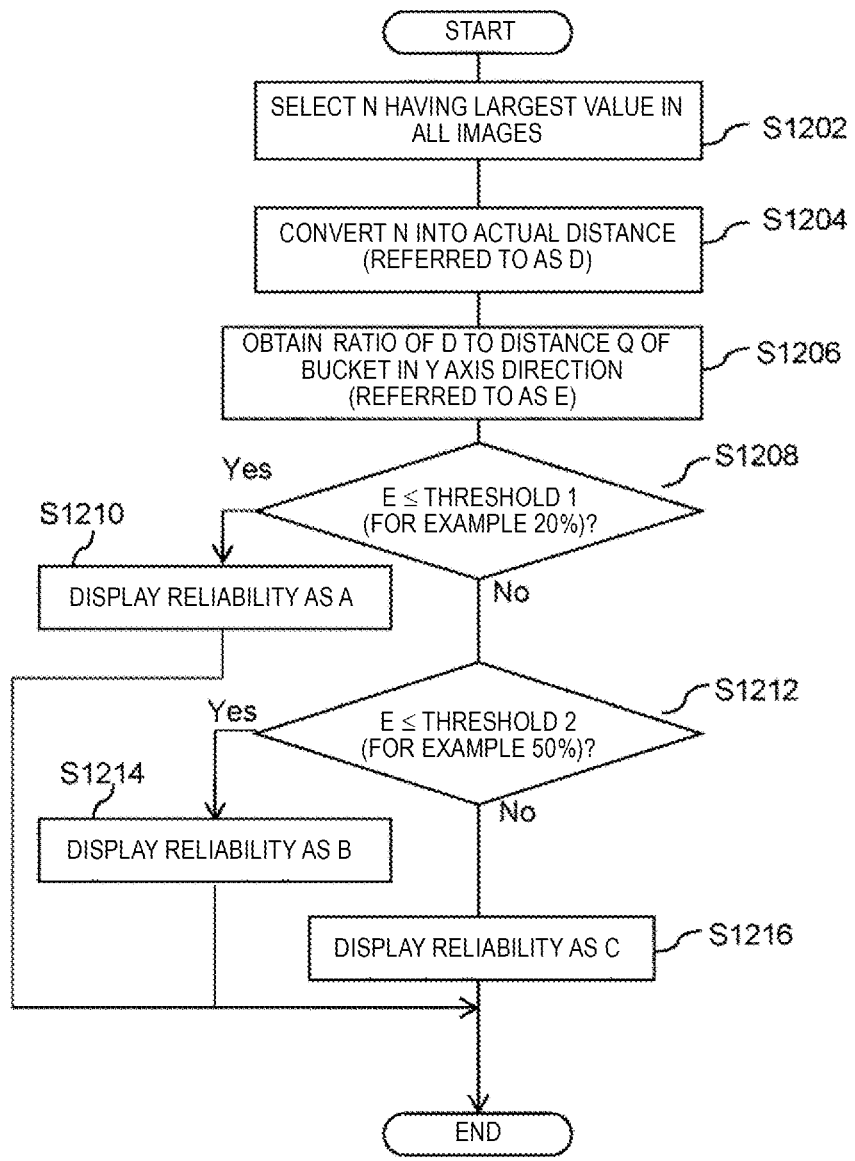

[Fig. 13]
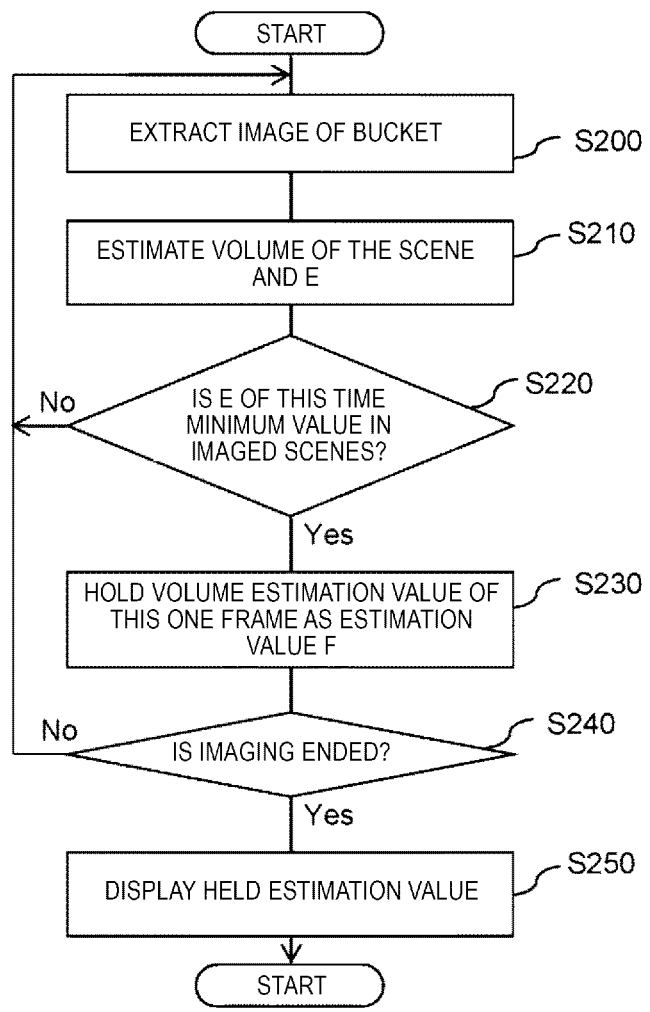

[Fig. 14]
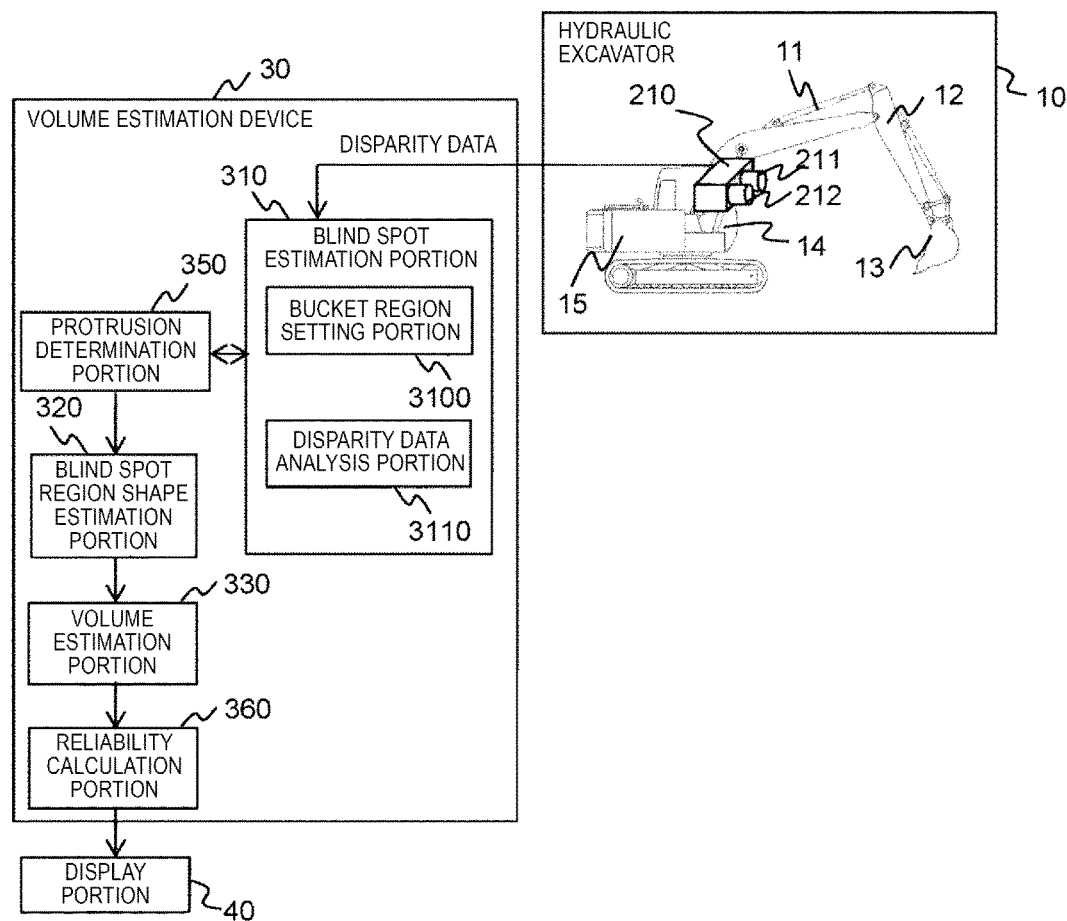

[Fig. 15]
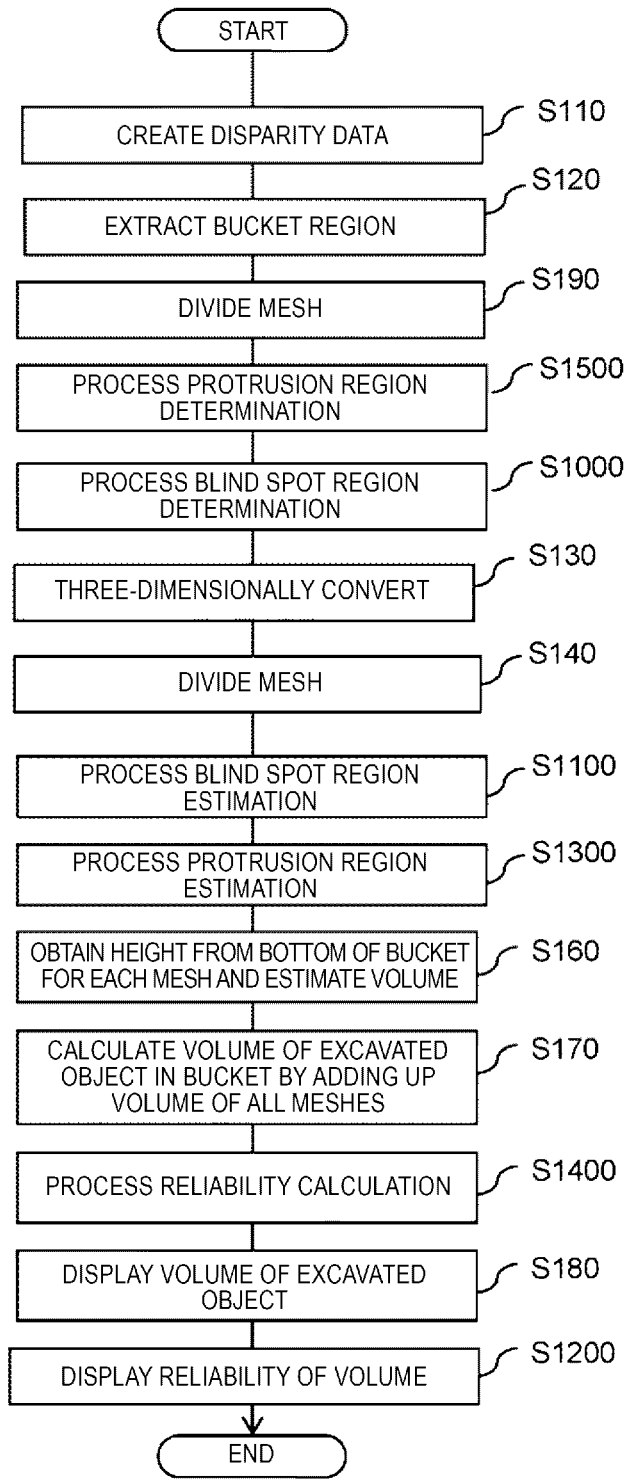

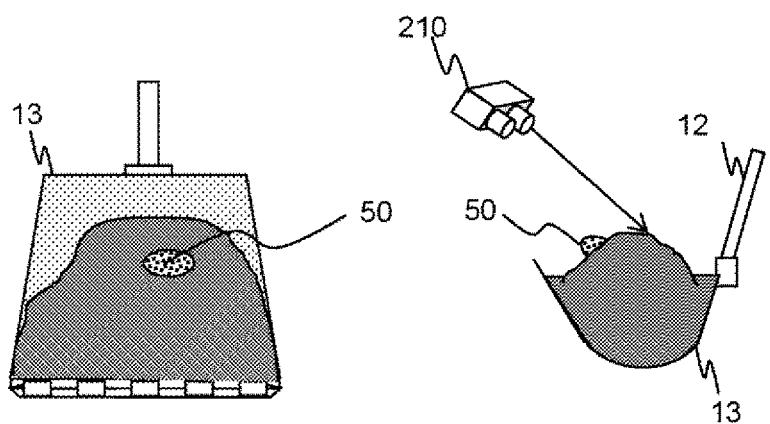
[Fig. 16A]   [Fig. 16B]
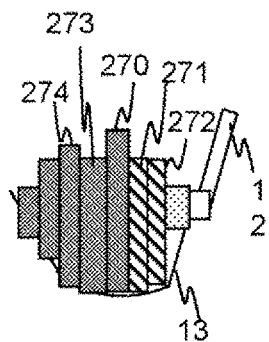
[Fig. 16C]

[Fig. 17]
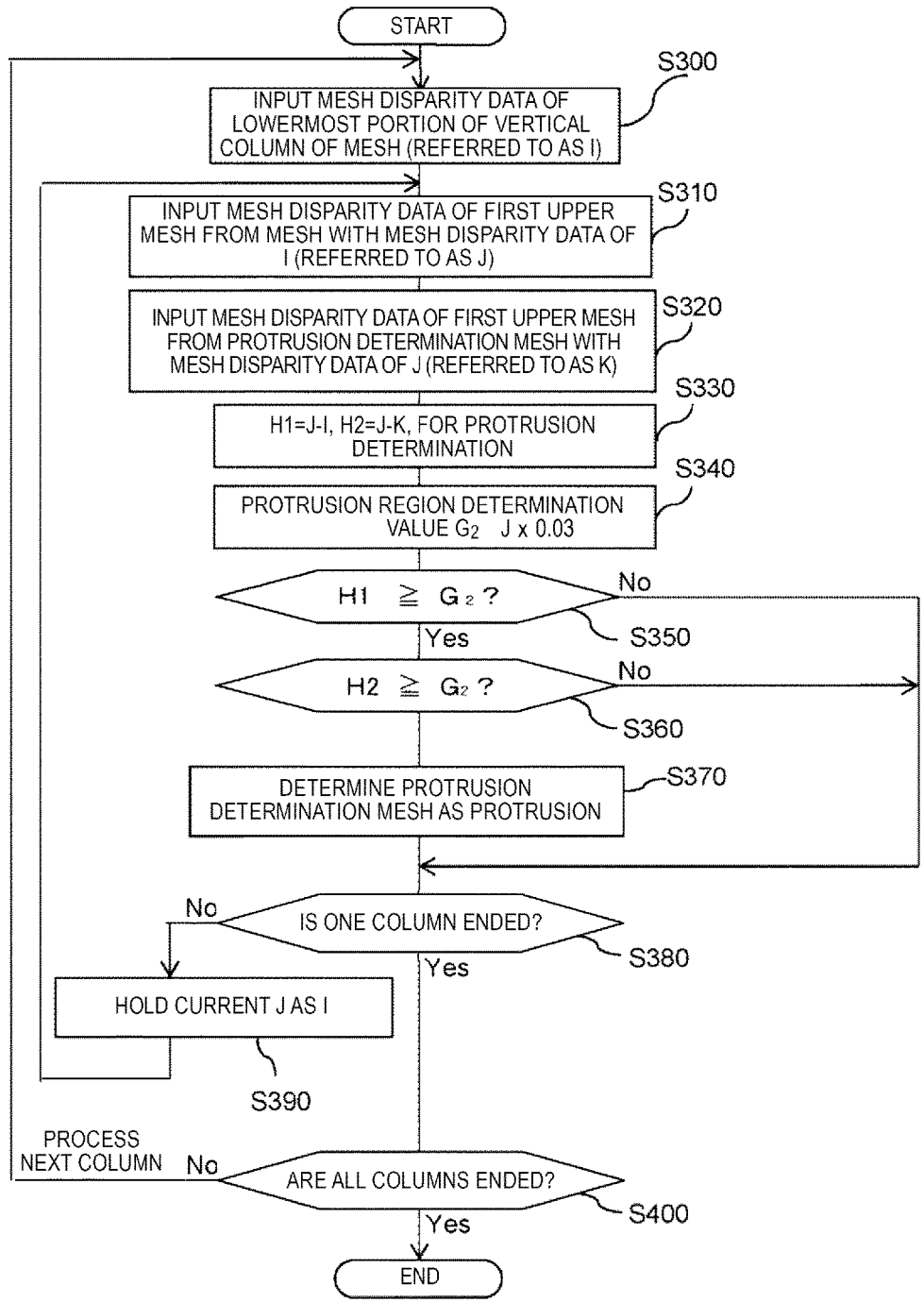

VOLUME ESTIMATION DEVICE AND WORK MACHINE USING SAME

TECHNICAL FIELD

The present invention relates to a volume estimation device and a work machine using the same.

BACKGROUND ART

In order to improve the excavation work efficiency at mines, an excavator needs to fill a dump with the prescribed number of excavations. Therefore, if the excavation amount per one time can be grasped, an operator can adjust the next amount to be excavated.

As a technique in taking this point into consideration, there is a technique that measures a volume by imaging an excavated object in a bucket by a stereo camera. For example, PTL 1 describes a method of calculating an amount loaded in the bucket by including a plurality of cameras on left and right side portions of a boom or left and right side portions of an arm and imaging the bucket by a camera located at substantially directly above the bucket.

However, in PTL 1, it is not assumed to estimate a blind spot region because the amount loaded in the bucket at the time of excavation is calculated by imaging when the bucket is moved to a position in which blind spot is not generated.

On the other hand, there are PTL 2 and PTL 3 as technologies for estimating the blind spot region. PTL 2 generates supplementary image data for supplementing a blind spot portion based on blind spot information estimated from a visible image portion of another vehicle included in a vehicle surrounding image obtained by a camera. In PTL 3, a slit image is captured by a camera when a measurement target is irradiated with the slit light, the volumes for each slit image are calculated, and the volumes are integrated to obtain the entire volume. In a case where the blind spot is generated in the slit image, correction is performed by previous and after data of the obtained data and data which cannot be obtained at the blind spot can be generated.

CITATION LIST

Patent Literature

PTL 1: JP-A-2008-241300
PTL 2: JP-A-2013-25528
PTL 3: JP-A-4-301707

SUMMARY OF INVENTION

Technical Problem

In PTL 2, in order to display an image of another vehicle more accurately, the shape of a blind spot portion of the image of another vehicle is supplemented. However, in PTL 2, a volume of the blind spot region is not measured. In PTL 3, it is difficult to accurately measure a volume of the entire measurement target including the blind spot region since it is corrected to a straight line by previous and after data of obtained data.

An object of the invention is to improve volume estimation accuracy of an object in a container using a captured image in a case where the blind spot region exists in the captured image of the object in the container.

Solution to Problem

A feature of the invention for solving the above problem is as follows, for example.

A blind spot estimation portion 310 for estimating a blind spot region of an object in a bucket 13; a blind spot region shape estimation portion 320 for estimating a shape of the object in the blind spot region; and a volume estimation portion 330 for estimating a volume of the object in the blind spot region are included, the blind spot estimation portion 310 estimates the blind spot region by mesh disparity data obtained from a captured image of the object in the bucket 13 imaged by a plurality of cameras, the blind spot region shape estimation portion 320 estimates the shape of the object in the blind spot region by the mesh disparity data, and the volume estimation portion 330 estimates the volume of the object in the blind spot region based on the shape of the object in the blind spot region estimated by the blind spot region shape estimation portion 320 and a shape of a bottom of the bucket 13.

Advantageous Effects of Invention

According to the invention, an object of the invention is to improve the volume estimation accuracy of an object in a container using a captured image in a case where the blind spot region exists in the captured image of the object in the container. Problems, configurations and effects other than those described above will be obvious from the description of following embodiments.

BRIEF DESCRIPTION OF DRAWINGS

FIG. 1 is a diagram illustrating a configuration of a volume estimation device mounted on a hydraulic excavator.

FIG. 2 is a diagram illustrating a method for creating disparity data by a stereo camera device.

FIGS. 3A and 3B are diagrams illustrating a captured image by the stereo camera device when excavated object in the bucket is flat.

FIGS. 4A and 4B are diagrams illustrating an outline of a method for estimating a volume of the excavated object.

FIG. 5 is a flow chart for estimating a volume of the excavated object.

FIGS. 6A and 6B are diagrams illustrating an example when a blind spot region is generated in the excavated object in a bucket.

FIG. 7 is a diagram illustrating an example of mesh disparity data when a blind spot region is generated in the excavated object in the bucket.

FIG. 8 is a diagram illustrating an estimation range when the volume of the excavated object is estimated without consideration of the blind spot region.

FIG. 9 is a flow chart of a volume estimation method considering the blind spot region.

FIG. 10 is a diagram illustrating a processing outline of a blind spot region estimation processing.

FIG. 11 is a flow chart of a blind spot region determination processing and a blind spot region estimation processing.

FIG. 12 is a flow chart for displaying reliability of the volume.

FIG. 13 is a flow chart for displaying a result of volume estimation with the highest reliability.

FIG. 14 is a diagram illustrating a configuration of the volume estimation device including a protrusion determination portion mounted on the hydraulic excavator.

FIG. 15 is a flow chart of the volume estimation method considering a blind spot region and a protrusion region.

FIGS. 16A-16C are diagrams illustrating an example of when a projection region is generated on the excavated object in the bucket.

FIG. 17 is a flowchart illustrating a protrusion region determination processing.

DESCRIPTION OF EMBODIMENTS

Hereinafter, embodiments of the present invention will be described using reference to the drawings or the like. The following description describes specific examples of the contents of the present invention, and the present invention is not limited to these description and various changes and modifications are possible by those skilled in the art within the scope of the technical idea disclosed in this specification. In addition, in all the drawings for illustrating the present invention, those having the same function are denoted by the same reference numerals and there is a case where the repeated description thereof is omitted.

Example 1

FIG. 1 is a diagram illustrating a configuration of a hydraulic excavator 10 which mounts a volume estimation device 30. The hydraulic excavator 10 has a boom 11 for excavation, an arm 12, a bucket 13, and an upper swivel body 15. The upper swivel body 15 includes an operating chamber 14.

In the operating chamber 14, a stereo camera device 210 is installed to recognize the outside world. The stereo camera device 210 has two cameras which is a right camera 212 and a left camera 211, and can measure a distance to a subject using disparities thereof. The stereo camera device 210 may be provided with two or more cameras, for example, three or four cameras may be provided.

The volume estimation device 30 is a device for estimating the volume of an excavated object in the bucket 13 imaged by the stereo camera device 210. The volume estimation device 30 includes a blind spot estimation portion 310 for estimating a blind spot region of the excavated object in the imaged container, a blind spot region shape estimation portion 320 for estimating the shape of the excavated object in the blind spot region, a volume estimation portion 330 for estimating a volume of the excavated object in the blind spot region, and a reliability calculation portion 360 for obtaining the estimation accuracy of the volume of the excavated object. The volume estimation result and reliability are displayed on a display portion 40. The blind spot estimation portion 310 estimates the blind spot region by mesh disparity data obtained from a captured image of an excavated object in the bucket 13 imaged by the stereo camera device 210. At first, the disparity data obtained from the captured image imaged by the stereo camera device 210 is input, and a bucket region setting portion 3100 extracts the region of the bucket 13 from the disparity data. The bucket region is divided into meshes, and mesh disparity data of each mesh is obtained from disparity data included in each mesh. A disparity data analysis portion 3110 performs determination on the blind spot region by using the mesh disparity data of the bucket region. Next, the blind spot region shape estimation portion 320 estimates the shape of the blind spot region. Hereinafter, these operations will be described in detail.

First, in FIG. 2, an outline of an operation in which the stereo camera device 210 generates disparity data is illustrated. When there is a right image 340 imaging the bucket 13 by the right imaging portion 212 and a left image 341 imaging the bucket 13 by the left imaging portion 211, a portion 344 of the bucket 13 is imaged at a position of a point 342 in the right image 340 and is imaged at a position of a point 343 in the left image 341. As a result, disparity d is generated at the point 342 and the point 343. The disparity d has a large value as the excavated object in the bucket 13 is close to the stereo camera device 210 and a small value as the excavated object in the bucket 13 is distant from the stereo camera device 210. The disparity obtained in this manner is obtained for the entire image. By using the disparity d, the distance from the excavated object in the bucket 13 to the stereo camera device 210 can be measured on the principle of triangular surveying. A distance $Z_1$ from the disparity d is obtained by the following expression.

$Z_1=(f \times P)/d$, where f is a focal length of the right and left cameras, and P is a distance between the right camera 212 and the left camera 211. In addition, in order to three-dimensionally convert the disparity data, the positions of $X_1$ and $Y_1$ on three-dimension of a point at which the above $Z_1$ is obtained are expressed by the following expressions.

$$X_1=(Z \times xr)/f,$$

$Y_1=(Z \times yr)/f$, where, xr is the x coordinate on the right image 340 and yr is the y coordinate on the right image 340. As described above, the positions ($X_1$, $Y_1$, and $Z_1$) on the three-dimensional space of the subject can be obtained from the distance from the stereo camera device 210 by the image captured by the stereo camera device 210.

FIG. 3 illustrates a captured image of the stereo camera device 210 when a surface of the excavated object in the bucket 13 is flat, as an example of a case where the blind spot of the excavated object is not generated even if a line of sight 220 is oblique.

FIG. 3 (a) is a diagram as viewed from a front surface of the camera, and FIG. 3 (b) is a cross-sectional view illustrating the bucket 13 parallel to a side surface of an arm 12. Since the stereo camera device 210 is installed in the operating chamber 14, the bucket 13 is imaged obliquely from above. In FIG. 3, even if the line of sight 220 is oblique, the blind spot of the excavated object is not generated.

FIG. 4 illustrates an outline of a method for calculating the volume of the excavated object. FIG. 4 (a) is a diagram illustrated a state where an inside of the bucket 13 obtained from the captured image is divided into two-dimensional mesh group 230. This drawing is an image capturing the bucket 13 from obliquely upper the bucket 13 by the stereo camera device 210 and is not an image capturing the bucket 13 from directly above the bucket 13. FIG. 4 (b) is a cross-sectional view illustrating the bucket 13 parallel to a side surface of the arm 12. As illustrated in FIG. 4 (a), the bucket opening surface is referred to as an xy plane, a right direction of the image captured by the camera is referred to as a positive direction of an x axis, and an upward direction thereof is referred to as a positive direction of a y axis. A right direction in FIG. 4 (b) is referred to as the positive direction of the Y axis and a downward direction therein is referred to as a positive direction of a z axis. A length of the bucket 13 in the Y axis direction is referred to as Q. The mesh disparity data of each mesh of the mesh group 230 is obtained from the disparity data included in each mesh. A method for obtaining the mesh disparity data includes a method for obtaining an average value or a median value of a plurality of disparity data, a method for obtaining an average value or a median value after reducing the number of disparity data, for example and is not limited to one method. Furthermore, by setting the mesh finely, the disparity data included in the mesh can be meshed into one. In this case, the mesh disparity data has the same value as the disparity data.

Since a bottom of the bucket 13 cannot be imaged in a state where the excavated object is contained in the bucket 13, the shape of the bucket 13 is required to be learned in advance. As a method for learning the shape of the bucket 13, a state in which the bucket 13 is empty is imaged by the stereo camera device 210, the captured image is divided by a mesh, and then in each mesh, a length from the bottom of the bucket 13 to a bucket opening surface is calculated. Alternatively, the shape of the bucket may be input by CAD data. If the length from the bucket opening surface of the bucket 13 of each mesh to the surface of the excavated object is obtained in the state where the excavated object is contained, the length from the bottom of the bucket 13 to the bucket opening surface is obtained when the bucket 13 is empty, and the two lengths are added for each corresponding mesh, then the length from the bottom of the bucket 13 to the surface of the excavated object can be obtained for each mesh. In each mesh, if the height from the bottom of the bucket 13 to the surface of the excavated object is obtained, the volume of each mesh is calculated and the volume of all the meshes is totaled, the volume of the excavated object in the bucket 13 can be obtained. Therefore, the blind spot region shape estimation portion 320 estimates the shape of the excavated object in the blind spot region by the mesh disparity data, and the volume estimation portion 330 estimates the volume of the excavated object in the blind spot region is estimated based on the shape of the excavated object in the blind spot region estimated by the blind spot region shape estimation portion 320 and the shape of the bottom of the bucket 13. A first upper mesh from a certain mesh is referred to as a mesh which is adjacent to the certain mesh in the positive direction of the y axis. A mesh in the lowermost portion is referred to as a mesh which is at the bottom of the mesh of the captured image.

FIG. 5 illustrates a flowchart for estimating the volume of the excavated object in a case where there is no blind spot region explained at FIG. 4.

<S110>

First, the bucket 13 is imaged by the stereo camera device 210, and disparity data is created from the captured image. As illustrated in FIG. 2, a method for creating disparity data is created by obtaining shift of the coordinates of the left image 341 and the right image 340 of the subject. The disparity data of the image captured by the stereo camera device 210 is obtained by obtaining this shift in all the meshes.

<S120>

Next, the bucket region setting portion 3100 extracts the bucket region. Buckets, ground, and earth and sand are conceivable as images captured by the stereo camera device 210 during excavation. As a method for extracting the bucket region from these subjects, a method for locating the bucket region to be extremely closer to the stereo camera device 210 than the ground or earth and sand is used. In other words, since the disparity data is extremely increased only in the bucket region, the bucket region can be extracted by using the disparity data.

<S130>

Next, the disparity data analysis portion 3110 performs three-dimensional conversion on the extracted disparity data of the bucket region to match the actual size.

<S140>

Next, the disparity data analysis portion 3110 divides the three-dimensionally converted bucket region into two-dimensional meshes. As the mesh size is small, the accuracy of volume estimation is further improved.

<S160>

Next, the length from the bottom of the bucket 13 to the surface of the excavated object is obtained for each two-dimensional mesh and the volume is calculated.

<S170>

Next, the volume of all the meshes is added up to calculate the volume of the excavated object in the bucket 13.

<S180>

The volume calculated in this manner is displayed on the display portion 40.

FIG. 6 illustrates an example where there is the blind spot region in the excavated object in the bucket 13. FIG. 6 (*a*) is a diagram illustrating the bucket 13 as viewed from the front surface of the camera and FIG. 6 (*b*) is a cross-sectional view illustrating the bucket 13 parallel to the side surface of the arm 12. In a case where the excavated object has a mountainous form, a back side of the mountainous form as viewed from the stereo camera device 210 becomes the blind spot region 221.

FIG. 7 illustrates an example of mesh disparity data when there is the blind spot region in FIG. 6. When paying attention to one column 231 of the mesh group 230, the mesh disparity data changes with a difference of about 1 or 2 from a mesh 243 to a mesh 241. However, the mesh disparity data from the mesh 241 to a mesh 240 is reduced by 9. This is because a distance 220*b* in FIG. 6 is abruptly greater than a distance 220*a*. Accordingly, it is determined that there is a blind spot region between meshes of which the mesh disparity data rapidly decreases.

FIG. 8 illustrates an estimation range when the volume of the excavated object is estimated without considering the blind spot region. A region between the mesh 241 and the mesh 240 in FIG. 7 becomes the blind spot region 221 and a volume smaller than the actual size is estimated. Therefore, a volume estimation method considering the blind spot region is required. In the state illustrated in FIG. 6, in the regions viewed from the stereo camera device 210, the distance 220*a* to the uppermost mountainous region and a distance 220*c* to the near side of the uppermost mountainous region are less changed and the distance 220*a* to the uppermost mountainous region and the distance 220*b* to a region ahead of the blind spot region is greatly different from each other. In other words, degree of change in the mesh disparity data greatly differs therebetween.

FIG. 9 illustrates a flowchart of the volume estimation method considering the blind spot region. A mesh division S190, a blind spot region determination processing S1000, a blind spot region estimation processing S1100, a volume reliability indication S1200, and a reliability calculation processing S1400 are added to the flowchart of FIG. 5.

The mesh division S190 divides the bucket region extracted in S120 into meshes. Since the mesh division S140 divides the three-dimensionally converted bucket regions into meshes, a size of the mesh divided by the mesh division S190 and a size of the mesh divided by the mesh division S140 may be different from each other.

The blind spot region determination processing S1000 is to perform a processing illustrated in FIG. 7 by the disparity data analysis portion 3110, and determines the blind spot region using the mesh disparity data. In the example of FIG. 7, a blind spot region exists between the mesh 241 and the mesh 240, in which the mesh disparity data of adjacent meshes in the y axis direction are significantly different from each other. The blind spot region estimation processing S1100 is to perform a processing by the blind spot region shape estimation portion 320. In the reliability calculation processing S1400, the reliability calculation portion 360 performs processing.

FIG. 10 illustrates a processing outline of the blind spot region estimation processing S1100 and is a cross-sectional view illustrating the bucket 13 parallel to the side surface of the arm 12. The mesh disparity data of a mesh bar 1243 is the value of the mesh 2243, the mesh disparity data of a mesh bar 1242 is the value of the mesh 2242, the mesh disparity data of a mesh bar 1241 is the value of the mesh 2241, the mesh disparity data of a mesh bar 1240 is the value of the mesh 2240, the mesh disparity data of a mesh bar 1260 is the value of a mesh 2260, and the mesh disparity data of a mesh bar 1261 is the value of a mesh 2261. Since the mesh bar 1260 and the mesh bar 1261 are in the blind spot region, mesh disparity data of the corresponding mesh cannot be estimated, and the volume cannot be estimated as it is. However, in a case where earth and sand or the like is to be formed into a mountainous shape at the bucket, in most cases of the mountainous shape, the shape of the side viewed from the stereo camera device 210 and the shape of the back side thereof has often a line-symmetrical shape in which a mesh bar including a peak of the mountainous shape is used as the axis. Therefore, the mesh bar 1260 of FIG. 10 is estimated to be at the same height from the mesh bar 1242 and the bucket opening surface and the mesh bar 1261 is estimated the same height from the mesh bar 1243 and the bucket opening surface to estimate the volume.

As described above, the blind spot region shape estimation portion 320 regards the shape of the excavated object to be line symmetrical according to the shape of the excavated object imaged by the plurality of cameras, and estimates the shape of the excavated object in the blind spot region. Since the shape of the excavated object has often a mountainous shape, the method for estimating by viewing the shape of the excavated object as being line symmetrical can more accurately estimate the volume of the excavated object than the method for estimating by using a straight line, a curved line, or the like.

FIG. 11 illustrates flowcharts of the blind spot region determination processing S1000 and the blind spot region estimation processing S1100. The mesh disparity data of the lowermost mesh of one column parallel to the y axis in the mesh group 230 is referred to as L and mesh disparity data of a first upper mesh from mesh of which the mesh disparity data is L in the positive direction of the y axis of the mesh is referred to as M. The mesh of which the mesh disparity data is L is referred to as the blind spot region determination mesh.

Then, the result of subtracting the mesh disparity data M from the mesh disparity data L is referred to as N. The blind spot estimation portion 310 estimates an area of the blind spot region by a size of N which is the difference of the mesh disparity data. In an example of FIG. 10, the area of the blind spot region is an area between the mesh bar 1241 and the mesh bar 1240. Accordingly, an area of an appropriate blind spot region can be estimated and the volume of the excavated objects is further accurately estimated.

<S1010>

First, the mesh disparity data of the lowermost mesh of one column parallel to the y axis in the mesh group 230 is input as L to be referred to as a blind spot region determination mesh. In the example of FIG. 7, the mesh disparity data of the mesh 243 is input as L.

<S1012>

Next, mesh disparity data of a first upper mesh from the blind spot region determination mesh of which the mesh disparity data is L is input as M. In the example of FIG. 7, the mesh disparity data of the mesh 242 is input as M.

<S1014>

Next, the difference between the mesh disparity data L and the mesh disparity data M is obtained and the difference value is referred to as N.

<S1018>

Next, a blind spot region determination value $G_1$ for determining presence or absence of the blind spot region is calculated. Here, as an example, the blind spot region determination value $G_1$ is referred to as 10% of the mesh disparity data L of the blind spot region determination mesh.

<S1020>

Next, in order to determine the presence or the absence of a blind spot region, it is determined whether or not N is equal to or greater than the blind spot region determination value $G_1$.

<S1022>

In a case where N is equal to or greater than the blind spot region determination value $G_1$, a region between the blind spot determination mesh of which the mesh disparity data is L and the mesh which is a first upper mesh from the blind spot region determination mesh and of which the mesh disparity data is M is determined as the blind spot region and estimation is performed as illustrated in FIG. 10.

<S1024>

Next, in order to determine the size of the blind spot region later, N of the column is stored.

<S1026>

If one column is ended, the process goes to the next column.

<S1028>

If one column is not ended, the mesh of which the current mesh disparity data is M is held as a blind spot region determination mesh of which the mesh disparity data is L. The process returns to S1012, and the same processing is performed, and in S1024, a new N of the column is stored. Accordingly, all the Ns equal to or greater than the blind spot region determination value $G_1$ are stored.

<S1030>

If all columns are ended, the processing is ended and if there are remaining columns, the processing of the adjacent column is performed.

As described above, the blind spot estimation portion 310 determines a region between the blind spot region determination mesh and the first upper mesh from the blind spot region determination mesh as a blind spot region using the mesh disparity data, in a case where the difference between the mesh disparity data of the blind spot region determination mesh which is a mesh included in the mesh group 230 and the mesh disparity data of the first upper mesh from the blind spot region determination mesh is equal to or greater than the blind angle region determination value $G_1$. The blind spot region determination value $G_1$ is determined by the mesh disparity data of the blind spot region determination mesh.

By calculating and setting the blind spot region determination value $G_1$ for determining the presence or the absence of the blind spot region for each mesh, the blind spot region determination value $G_1$ which is proper to a shape of the excavated object can be used and the blind spot region can be further correctly determined, compared to a case where the blind spot region determination value $G_1$ is constant in all the meshes. In addition, influence of noise or concave and convexity of minute earth and sand can be eliminated by determining the blind spot region determination value $G_1$ by a size of the difference of the mesh disparity data and determining the blind spot region.

FIG. 12 is a flow chart for displaying the reliability of the volume of the excavated object on the display portion 40.

<S1202>

The N having the largest value is selected from one vertical column calculated in FIG. 11. Then, N having the largest value is selected from each column.

<S1204>

Next, N is converted into actual distance data which is referred to as D.

<S1206>

Next, a ratio of D to the length Q of the bucket 13 in the Y axis direction is obtained, and this ratio is referred to as E. E is a ratio occupied by the estimated blind spot region to the size of the bucket 13.

<S1208>

Next, it is determined whether or not E is equal to or less than the threshold 1.

<S1210>

If E is equal to or less than the threshold 1, since the blind spot region is small, it is synonymous with a small blind spot estimation area and it can be determined that the reliability is high. Therefore, if E is equal to or less than 1% of the threshold value, A is displayed on the display portion 40, which means that the volume reliability of the excavated object is high. Accordingly, the reliability calculation portion 360 determines the reliability of the volume of the excavated object according to the area of the blind spot region.

<S1212>

If S1208 is No, it is determined whether or not E is equal to or less than the threshold 2.

<S1214>

If S1212 is Yes, B is displayed on the display portion 40 as an intermediate reliability.

<S1216>

If S1212 is No, it is determined that the volume cannot be accurately estimated, and C is displayed on the display portion 40 as the reliability.

Here, as an example, the threshold 1 is referred to as 20% and the threshold 2 is referred to as 50%. However, these thresholds are not limited to these and can be changed depending on the application situation. In addition, the threshold level can be also increased or decreased. The reliability is not limited to the display using symbols such as A and B, but it can be displayed with numbers or the like.

According to the above method, the volume can be estimated with high accuracy since the blind spot region can be estimated even if a blind spot region is generated when excavated objects in the bucket 13 are imaged by the stereo camera device 210. It is not limited to the excavated objects in the bucket as the target of estimating the volume of the blind spot region which is generated when imaged using the camera. Besides excavated objects in the bucket, it is only necessary for some containers to contain objects.

In the present example, although the volume of the excavated object in the bucket of the excavator is taken as a target, a volume of loaded object such as a dump may be taken as a target.

Example 2

As a second example, an example of selecting a captured image in a case where the reliability is highest in a plurality of captured images, that is, the area of the blind spot region is smallest is illustrated. FIG. 13 illustrates a flowchart for displaying the volume estimation result with the highest reliability. A plurality of captured images can be obtained by imaging a plurality of times using the stereo camera device 210. Alternatively, a plurality of captured images can be obtained by imaging an excavated object in a moving image format using the stereo camera device 210 and extracting a plurality of frames. A captured image having the highest reliability is selected from a plurality of captured images. E may be obtained by the blind spot region shape estimation portion 320, the volume estimation portion 330, the reliability calculation portion 360, or the like.

<S200>

First, the image of the bucket 13 is extracted as one frame of the moving image scene.

<S210>

Next, the volume and E are estimated by the method of FIG. 12.

<S220>

Next, it is determined whether or not the E is the minimum value in the imaged scenes.

<S230>

If the E is the minimum value, the volume estimation value of the one frame is stored as the estimation value F.

<S240>

Next, it is determined whether or not the imaging is ended and if the imaging is not ended, the processing is repeated from the beginning. As a method for determining whether or not the imaging is ended, there is a method of inputting a signal indicating that the upper swivel body 15 is started to rotate from a control device of the excavator 10, a method of an operator inputting by a switch operation, or the like.

<S250>

When imaging is ended, the estimation value and the reliability with the highest reliability which are held are displayed on the display portion 40.

According to the above method, since a captured image in a case where the area of the blind spot region is smallest is selected from a plurality of captured images imaged by the plurality of cameras and the volume of the excavated object in the bucket imaged by the plurality of camera can be estimated based on the selected captured image, the volume of the excavated object can be accurately estimated and the estimation result with the highest reliability can be displayed on the display portion 40.

Example 3

As a third example, an example of estimating the volume of the blind spot region of a case where the shape of the excavated object in the bucket 13 is unique is illustrated.

FIG. 14 illustrates a configuration of a hydraulic excavator equipped with a protrusion determination portion 350 for determining the protrusion region of the excavated object in the bucket 13. The configuration other than the protrusion determination portion 350 is the same as in FIG. 1.

FIG. 15 illustrates a flowchart of a volume estimation method considering the protrusion region and the blind spot region. A protrusion region determination processing S1500 and a protrusion region estimation processing S1300 are added to the flowchart of FIG. 9.

FIG. 16 (a) is a diagram illustrating the excavated objects in the bucket 13 as viewed from the front surface of the camera. There is a protrusion 50 such as stone in the excavated objects. FIG. 16 (b) is a cross-sectional view illustrating the bucket 13 parallel to the side surface of the arm 12, and there is the protrusion 50. Under such circumstances, if the blind spot region is estimated using the method in FIG. 10, it is estimated on premise that the protrusion 50 also exists in the blind spot region. If such a protrusion 50 rarely exists, it can be considered that there is no protrusion 50 in the blind spot region. If there is the protrusion 50 on a side viewed from the stereo camera device 210, since the distance from the stereo camera device 210 to a surface of the excavated object in which the protrusion 50 exists is decreased by the length of the protrusion 50, the disparity data becomes large. Therefore, the mesh disparity data of the mesh in which the protrusion 50 exists is greater than the mesh disparity data of two meshes in front and behind of the mesh in which the protrusion 50 exists in the y axis direction. Two meshes in front and behind of the mesh in which the protrusion 50 exists in the y axis direction refer to a mesh adjacent in the positive direction of the y axis of the mesh in which the protrusion 50 exists and a mesh adjacent in the negative direction of the y axis of a mesh in which the protrusion 50 exists. The existence of the protrusion 50 can be grasped by using this phenomenon.

FIG. 16 (c) illustrates the protrusion region estimation processing S1300 in a case where there is the protrusion 50. The protrusion region estimation processing S1300 performs the processing by the blind spot region shape estimation portion 320. A mesh bar 271 and a mesh bar 272 are blind spot regions. The mesh bar 271 is set to the same height as a mesh bar 273 from the bucket opening surface. In the method of FIG. 10, the mesh bar 272 is set to the same height as a mesh bar 274 from bucket opening surface. However, since the height of the mesh bar 274 is increased by the protrusion 50, the method of FIG. 10 estimates a volume greater than an actual volume. Therefore, the mesh bar 272 is set to the same height as the mesh bar 271 from the bucket opening surface. Accordingly, an estimation error of the volume due to the protrusion 50 can be prevented. According to the above method, the volume can be accurately estimated by changing the estimation method of the shape of the blind spot region according to the shape of the excavated object in the region viewed from the stereo camera device 210.

FIG. 17 is a flowchart of the protrusion region determination processing S1500. In the protrusion region determination processing S1500, the protrusion determination portion 350 performs processing. The mesh disparity data of the lowermost mesh of one column parallel to the y axis in the mesh group 230 is referred to as I, mesh disparity data of a first upper mesh from the mesh of which the mesh disparity data is I is referred to as J, and mesh disparity data of a first upper mesh from the mesh of which the mesh disparity data is J is referred to as K. The mesh of which the mesh disparity data is J is referred to as a protrusion determination mesh. Then, the result of subtracting the mesh disparity data I from the mesh disparity data J is referred to as H1, and the result of subtracting the mesh disparity data K from the mesh disparity data J is referred to as H2.

<S300>

First, the mesh disparity data of the lowermost mesh of one column parallel to the y axis in the mesh group 230 is input as I.

<S310>

Next, the mesh disparity data of the first upper mesh from the mesh of which the mesh disparity data is I is input as J. The mesh of which the mesh disparity data is J is referred to as a protrusion determination mesh.

<S320>

Next, mesh disparity data of a first upper mesh from the protrusion determination mesh of which the mesh disparity data is J is input as K.

<S330>

Next, the result of subtracting the mesh disparity data I from the mesh disparity data J is referred to as H1, and the result of subtracting the mesh disparity data K from the mesh disparity data J is referred to as H2.

<S340>

Next, a protrusion region determination value $G_2$ for determining the presence or the absence of the protrusion region is calculated. Here, as an example, the protrusion region determination value $G_2$ is referred to as 3% of the mesh disparity data J of the protrusion determination mesh. As described above, the protrusion region determination value $G_2$ is determined by the mesh disparity data of the protrusion determination.

<S350>

It is determined that in a case where H1 is equal to or greater than the protrusion region determination value $G_2$, there is a possibility that the protrusion region exists, and that in a case where H1 is less than the protrusion region determination value $G_2$, the protrusion region does not exist.

<S360>

Further, it is determined that in a case where H2 is equal to or greater than the protrusion region determination value $G_2$, the protrusion region exists and in a case where H2 is less than the protrusion region determination value $G_2$, the protrusion region does not exist.

<S370>

The protrusion determination mesh of which the mesh disparity data is J is determined as the protrusion area.

<S380>

If one column is ended, the process goes to the next column.

<S390>

If one column is not ended, a protrusion determination mesh of which the current mesh disparity data is J is held as a mesh of which the mesh disparity data is I.

<S400>

If all the columns are ended, the processing is ended, and if there are remaining columns, processing of the remaining columns is performed.

As described above, using the mesh disparity data, the protrusion determination portion 350 determines the protrusion determination mesh as the protrusion region in a case where the differences between the mesh disparity data of the protrusion determination mesh which is the mesh included in the mesh group 230 and the mesh disparity data of previous and after meshes of the protrusion determination mesh are respectively equal to or greater than the protrusion region determination value.

By calculating and setting the protrusion determination value $G_2$ for determining the presence or the absence of the protrusion region for each mesh, the protrusion determination value $G_2$ that is proper to the shape of the protrusion 50 can be used and the protrusion region can be more accurately determined, compared to a case where the protrusion determination value $G_2$ is constant in all the meshes.

REFERENCE SIGNS LIST 10 hydraulic excavator, 11 boom, 12 arm, 13 bucket, 14 operating chamber, 15 upper swivel body, 30 volume estimation device, 40 display portion, 50 protrusion of excavated object in bucket, 210 stereo camera device, 221 blind spot region, 230 mesh group, 310 blind spot estimation portion, 320 blind spot region shape estimation portion, 330 volume estimation portion, 350 protrusion determination portion, 360 reliability calculation portion, 3100 bucket region setting portion, 3110 disparity data analysis portion

The invention claimed is:

1. A volume estimation device, comprising:
a blind spot estimation portion for estimating a blind spot region of an object in a container;
a blind spot region shape estimation portion for estimating a shape of the object in the blind spot region; and
a volume estimation portion for estimating a volume of the object in the blind spot region,
wherein the blind spot estimation portion estimates the blind spot region by mesh disparity data obtained from a captured image of the object in the container imaged by a plurality of cameras,
the blind spot region shape estimation portion estimates the shape of the object in the blind spot region by the mesh disparity data, and
the volume estimation portion estimates the volume of the object in the blind spot region based on the shape of the object in the blind spot region estimated by the blind spot region shape estimation portion and a shape of a bottom of the container.

2. The volume estimation device according to claim 1,
wherein a blind spot region determination mesh is included in a mesh group divided into two-dimension in the container,
the blind spot estimation portion determines a region between the blind spot region determination mesh and a first upper mesh from the blind spot region determination mesh as the blind spot region in a case where a difference between the mesh disparity data of the blind spot region determination mesh and the mesh disparity data of the first upper mesh from the blind spot region determination mesh is equal to or greater than a blind spot region determination value, using the mesh disparity data, and
the blind spot region determination value is determined by the mesh disparity data of the blind spot region determination mesh.

3. The volume estimation device according to claim 2,
wherein the blind spot estimation portion estimates an area of the blind spot region by a size of the difference between the mesh disparity data.

4. The volume estimation device according to claim 1, further comprising:
a reliability calculation portion for determining the reliability of the volume of the object by the area of the blind spot region,
wherein the reliability of the volume of the object is displayed on a displaying portion.

5. The volume estimation device according to claim 1,
wherein the blind spot region shape estimation portion estimates the shape of the object in the blind spot region imaged by the plurality of cameras based on the captured image in a case where the area of the blind spot region is minimized from the plurality of captured images imaged by the plurality of cameras.

6. The volume estimation device according to claim 2, further comprising:
a protrusion determination portion for determining a protrusion region of the object,
wherein the protrusion determination mesh is included in the mesh group, and
the protrusion determination portion determines the protrusion determination mesh as a protrusion region in a case where differences between the mesh disparity data of the protrusion determination mesh and the mesh disparity data of previous and after meshes of the protrusion determination mesh are respectively equal to or greater than a protrusion region determination value.

7. The volume estimation device according to claim 6,
wherein the protrusion region determination value is determined by the mesh disparity data of the protrusion determination mesh.

8. A work machine using the volume estimation device according to claim 1.

* * * * *